(12) United States Patent
Takeshita et al.

(10) Patent No.: US 8,439,762 B2
(45) Date of Patent: May 14, 2013

(54) TORSIONAL DAMPER

(75) Inventors: Yoshito Takeshita, Echizen (JP);
Fumiaki Doseki, Echizen (JP); Masaaki Yamaguchi, Echizen (JP); Taku Suzuki, Echizen (JP)

(73) Assignee: Aisin Aw Industries Co., Ltd. (JP)

( * ) Notice: Subject to any disclaimer, the term of this patent is extended or adjusted under 35 U.S.C. 154(b) by 130 days.

(21) Appl. No.: 12/999,092

(22) PCT Filed: Feb. 26, 2010

(86) PCT No.: PCT/JP2010/053698
§ 371 (c)(1),
(2), (4) Date: Dec. 15, 2010

(87) PCT Pub. No.: WO2011/040058
PCT Pub. Date: Apr. 7, 2011

(65) Prior Publication Data
US 2011/0120832 A1    May 26, 2011

(30) Foreign Application Priority Data

Sep. 29, 2009 (JP) .................................. 2009-225071

(51) Int. Cl.
*F16D 7/02* (2006.01)
(52) U.S. Cl.
USPC .............................. 464/10; 464/46; 464/68.1
(58) Field of Classification Search .................... 464/10, 464/45–48, 66.1–68.92, 67.1
See application file for complete search history.

(56) References Cited

U.S. PATENT DOCUMENTS

| 1,789,862 | A | * | 1/1931 | Bricken ....................... 464/48 X |
| 4,643,289 | A | * | 2/1987 | Yoneda et al. ......... 464/68.41 X |
| 4,788,884 | A | | 12/1988 | Reik et al. |
| 5,435,783 | A | | 7/1995 | Rohrle |
| 5,653,639 | A | | 8/1997 | Gassmann |
| 6,910,562 | B2 | * | 6/2005 | Bauer et al. |
| 2006/0196751 | A1 | | 9/2006 | Schneider et al. |
| 2006/0225984 | A1 | * | 10/2006 | Tanishima et al. |
| 2008/0128235 | A1 | | 6/2008 | Avins et al. |
| 2010/0051411 | A1 | | 3/2010 | Saeki et al. |

FOREIGN PATENT DOCUMENTS

DE    102008008005  A1    8/2009
JP    2008-274969  A    11/2008

OTHER PUBLICATIONS

International Search Report for PCT/JP2010/053698.
Office Action for German Patent Application No. 11 2010 003 845.7 issued Aug. 9, 2012.

* cited by examiner

*Primary Examiner* — Gregory Binda
(74) *Attorney, Agent, or Firm* — Caesar, Rivise, Bernstein, Cohen & Pokotilow, Ltd.

(57) ABSTRACT

A torsional damper includes a torque limiter and a damper. The torque limiter includes at least two friction members, allows transmission of torque, and prohibits transmission of excessive torque. The damper absorbs torsional vibration through resilient deformation of a spring. The torque limiter is a wet torque limiter in which the friction members are arranged in an oil chamber filled with lubricating oil. The damper is a dry damper in which the spring is not immersed in the lubricating oil.

6 Claims, 7 Drawing Sheets

US 8,439,762 B2

TORSIONAL DAMPER

FIELD OF THE INVENTION

The present invention relates to a torsional damper that absorbs torsional vibration resulting from torque fluctuation, and, more particularly, to a torsional damper including a friction-type torque limiter that prevents the transmission of excessive torque.

BACKGROUND OF THE INVENTION

A torsional damper for absorbing torsional vibration resulting from torque fluctuation is arranged in an automobile at a location, for example, where an output shaft of an internal combustion engine is coupled to an input shaft of a transmission. As such a torsional damper, a known torsional damper includes a friction-type torque limiter, which slips when an excessive torque is input to prevent excessive load from acting on each part of a mechanism coupled to the torsional damper.

A dry torque limiter is often used as such a friction-type torque limiter arranged in a torsional damper. The dry torque limiter holds a dry friction plate with a predetermined pressure, and transmits torque through the frictional force generated by the friction plate.

In such dry torque limiter, however, rusting of the friction plate may increase the tolerable transmission torque, which is the maximum torque that can be transmitted without causing slippage. When the tolerable transmission torque increases, slippage does not occur when the transmission of torque should be stopped. As a result, the internal combustion engine and the transmission may not be protected from excessive load.

Japanese Laid-Open Patent Publication No. 2008-274969 discloses a torsional damper that prevents such changes in the tolerable transmission torque. This torsional damper is entirely accommodated in a case, and lubricating oil is filled in the case. This immerses a spring of the damper and a friction plate of a torque limiter in the lubricating oil.

In detail, as shown in FIG. 7, the torsional damper described in Japanese Laid-Open Patent Publication No. 2008-274969 includes a case 3 having a rear cover 1 and a front cover 2. A torque limiter 5, which includes a friction plate 4, and a damper 7, which includes a spring 6, are arranged in the case 3. The case 3 is filled with lubricating oil to lubricate the torque limiter 5 and the damper 7.

When employing such a structure, the lubricating oil functions to prevent the friction plate 4 from rusting. This prevents changes in the tolerable transmission torque that would be caused when the friction plate 4 rusts.

In the torsional damper described in Japanese Laid-Open Patent Publication No. 2008-274969, however, the spring 6 of the damper 7 is immersed in the lubricating oil. Thus, when the temperature of the lubricating oil is low, the viscosity of the lubricating oil inhibits deformation of the spring 6. As a result, the effect of the damper 7 for absorbing torsional vibration may not be fully exhibited.

SUMMARY OF THE INVENTION

It is an object of the present invention to provide a torsional damper that absorbs torsional vibration even under low temperatures in a preferable manner while preventing changes in the tolerable transmission torque that would result from rusting of a friction member in a torque limiter.

One aspect of the present invention is a torsional damper including a torque limiter and a damper. The torque limiter includes at least two friction members. The torque limiter allows transmission of torque with frictional force acting between the friction members when torque input to the torque limiter is less than or equal to a tolerable transmission torque. The torque limiter prohibits transmission of excessive torque by slipping the friction members when the input torque is greater than the tolerable transmission torque. The damper, which includes a spring, absorbs torsional vibration, which results from fluctuation in torque input to the damper, through resilient deformation of the spring. The torque limiter is a wet torque limiter including an oil chamber filled with lubricating oil and holding the friction members in the oil chamber. The damper is a dry damper in which the spring is not immersed in the lubricating oil.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
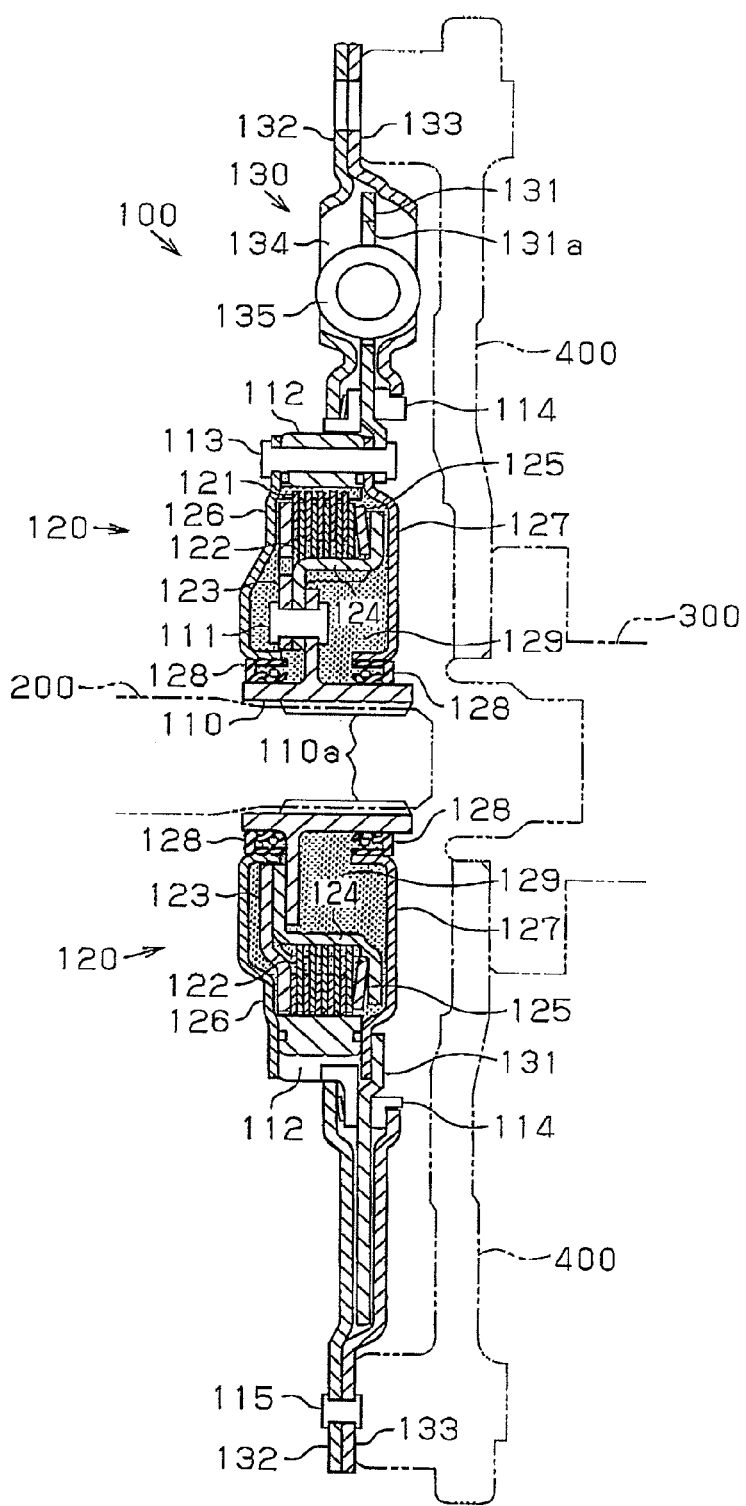
FIG. 1 is a cross-sectional view of a torsional damper according to one embodiment of the present invention.
Figure 2:
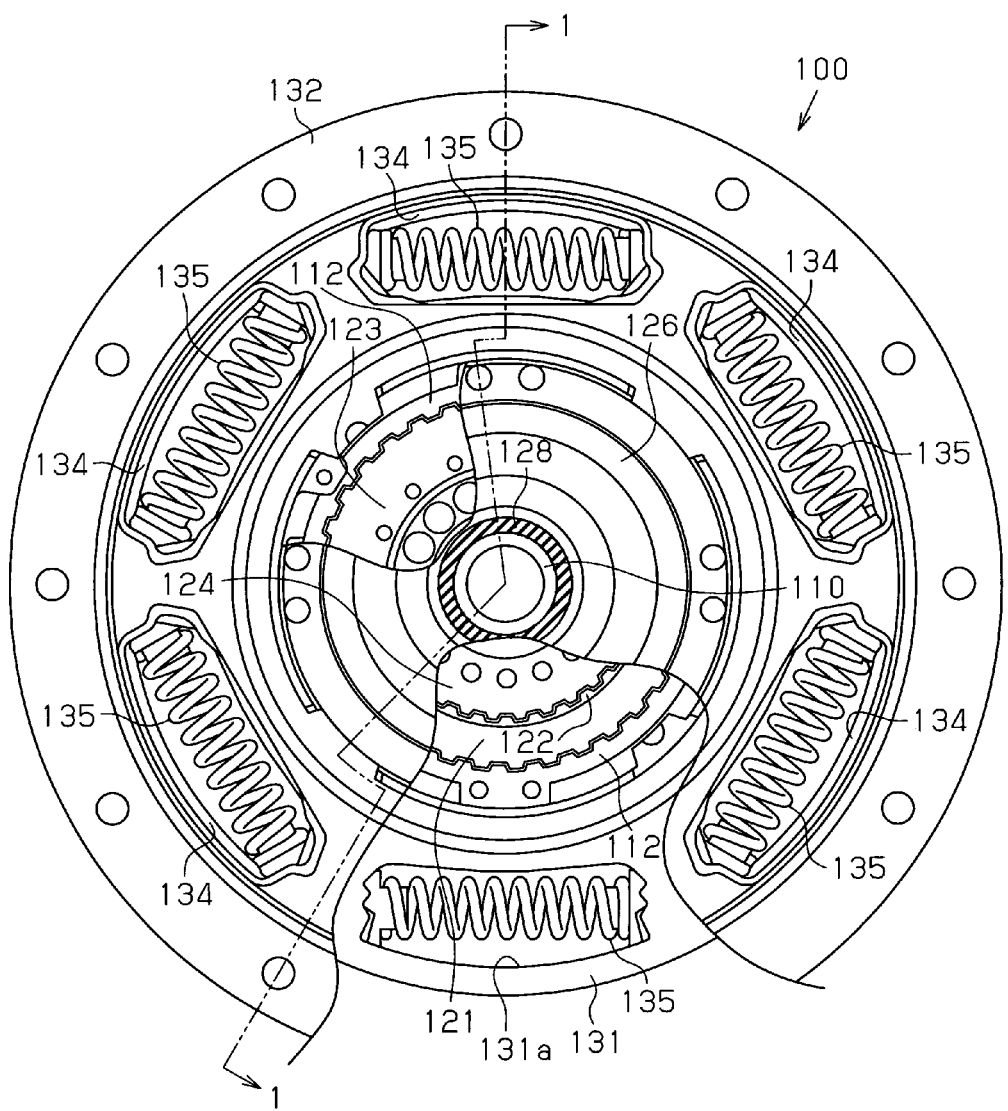
FIG. 2 is a partially cutaway plan view showing the torsional damper of FIG. 1.

A torsional damper 100 according to one embodiment of the present invention will now be discussed with reference to FIGS. 1 and 2. The torsional damper 100 is coupled to a hybrid transaxle and an internal combustion engine of a hybrid vehicle. FIG. 1 is a cross-sectional view of the torsional damper 100 according to the present embodiment, and FIG. 2 is a partially cutaway plan view of the torsional damper 100. FIG. 1 shows the cross-section taken along line 1-1 in FIG. 2.

As shown in FIGS. 1 and 2, the torsional damper 100 is disc-shaped. The torsional damper 100 includes an inner circumferential portion, which is coupled to an input shaft 200 of the hybrid transaxle that is shown by double-dashed lines in FIG. 1, and an outer circumferential portion, which is coupled to a fly wheel 400 that is coupled to a crankshaft 300 of the internal combustion engine. The torsional damper 100 transmits torque between the input shaft 200 and the fly wheel 400.

As shown in FIG. 1, the input shaft 200 is coupled to a tubular hub 110, which serves as a second member. Splines 110a are formed in the inner circumferential surface of the hub 110. The splines 110a are engaged with the input shaft 200, which is inserted into the hub 110. A flange extends in the radial direction from the outer circumferential surface of the hub 110. A first support 123 and a second support 124 hold friction plates 121 and 122, which serve as friction members of the torque limiter 120, are fixed to the flange by rivets 111. Hereinafter, the phrases "radially outward" and "radially inward" respectively refer to a radially outward side and a radially inward side of the torsional damper 100.

As shown in FIG. 1, the second support 124 includes a radially outward portion, which is bent away from the first support 123. Part of the radially outward portion extends in a thickness direction of the torsional damper 100 (lateral direction as viewed in FIG. 1). The radially outward surface of this part is provided with splines, which extend in the lateral direction as viewed in FIG. 1. The second friction plates 122 are engaged with the splines in a manner prohibiting relative rotation.

A ring-shaped intermediate member 112, which serves as a first member, is arranged on the radially outward side of the first support 123 and the second support 124. The intermediate member 112 is coupled to the fly wheel 400 by a damper 130, which will be described later.

As shown in FIG. 1, the first and second friction plates 121 and 122 are held between the first support 123 and the second support 124 in such a manner that the first friction plates 121 are arranged alternately with the second friction plates 122. The first friction plates 121 engage splines formed on the radially inward surface of the intermediate member 112 in such a manner to prevent relative rotation between the first friction plates 121 and the splines. A disc spring 125 is held between the first support 123 and the second support 124 together with the friction plates 121 and 122. The magnitude of the frictional force generated between the friction plates 121 and 122 is adjusted by the biasing force of the disc spring 125.

A disc member 131, which extends radially outward, a first wall member 126 and a second wall member 127, which extend radially inward, are fixed to the intermediate member 112, which is engaged with the first friction plates 121, by rivets 113.

As shown in FIG. 1, the first wall member 126 and the second wall member 127 extend radially inward and encompass the friction plates 121 and 122 and the supports 123 and 124.

Referring to FIG. 1, an oil seal 128 is press-fitted into a portion of the torsional damper 100 in which the outer circumferential surface of the hub 110 faces the radially inward end of the first wall member 126. A further oil seal 128 is press-fitted into a portion of the torsional damper 100 in which the outer circumferential surface of the hub 110 faces the radially inward end of the second wall member 127. The first wall member 126, the second wall member 127, and the oil seal 128 form an oil chamber 129 that encompasses the friction plates 121 and 122 and the supports 123 and 124.

The oil chamber 129 is filled with lubricating oil. This forms the wet torque limiter 120, in which the friction plates 121 and 122 are held in a state immersed in lubricating oil.

The disc member 131 includes six through-holes 131a, which are arranged in equal intervals. As shown at the lower side of FIG. 2, each through-hole 131a extends in the circumferential direction. As shown in FIG. 1, the disc member 131 is held between a first retaining member 132 and a second retaining member 133. The disc member 131 is rotatable relative to the first and second retaining members 132 and 133.

The retaining members 132 and 133 each have six openings corresponding to the six through-holes 131a. The retaining members 132 and 133 have radially outward portions that are coupled together by rivets 115 in a state holding the disc member 131 in between, as shown at the lower side in FIG. 1. By coupling the first retaining member 132 and the second retaining member 133 with the disc member 131 held in between, the corresponding openings of the retaining members 132 and 133 come into communication with each other and form a retaining compartment 134 at locations corresponding to the through-holes 131a, as shown at the upper side in FIG. 1.

As shown in FIG. 2, the rotational phases of the coupled retaining members 132 and 133 and the disc member 131 are adjusted to align the retaining compartments 134 with the corresponding through-holes 131a. Then, a coil spring 135 is arranged in each through-hole 131a.

The first retaining member 132, the second retaining member 133, the disc member 131, and the coil spring 135 form the damper 130.

In the damper 130, when the retaining members 132 and 133 and the disc member 131 rotate relatively and displace the retaining compartments 134 and the through-holes 131a, the coil springs 135 are resiliently, or elastically, deformed and compressed. In other words, the coil springs 135 are resiliently deformed when the disc member 131 connected to the hub 110, which is coupled to the input shaft 200 by the torque limiter 120, and the retaining members 132 and 133, which are coupled to the fly wheel 400, are relatively rotated by a torque fluctuation between the input shaft 200 and the fly wheel 400. Resilient deformation of the coil springs 135 absorbs torsional vibration generated between the input shaft 200 and the fly wheel 400. This suppresses the transmission of torsional vibration resulting from the torque fluctuation between the internal combustion engine and the hybrid transaxle.

The radially inward ends of the first retaining member 132 and the second retaining member 133 are provided with a hysteresis mechanism 114. When the relative rotation phase difference between the disc member 131 and the retaining members 132 and 133 becomes greater than or equal to a predetermined amount, the hysteresis mechanism 114 acts as a brake that prevents the relative rotation phase difference from increasing.

In this manner, in the torsional damper 100 of the present embodiment, the wet torque limiter 120, in which the friction plates 121 and 122 are held in a state immersed in lubricating oil, is combined with the dry damper 130, in which the coil springs 135 are not immersed in lubricating oil. As shown in FIG. 1, in the torsional damper 100, the wet torque limiter 120 is arranged at the radially inward side, and the dry damper 130 is arranged at the radially outward side.

The torsional damper 100 of the embodiment discussed above has the advantages described below.

(1) The torsional damper 100 uses the dry damper 130, in which the coil springs 135 are not immersed in lubricating oil, as a damper for absorbing torsional vibration resulting from torque fluctuation. Thus, the coil springs 135 of the damper 130 are deformed without being affected by the viscosity of the lubricating oil, and torsional vibration is suppressed in a preferable manner even under low temperatures that increase the viscosity of the lubricating oil.

Further, the torsional damper 100 uses the wet torque limiter 120, in which the first friction plates 121 and second friction plates 122 serving as the friction members are held in the oil chamber 129 filled with lubricating oil, as a torque limiter for transmitting torque with the frictional force generated at the friction members. This suppresses changes in the tolerable transmission torque that would be caused by rusting of the first friction plates 121 and the second friction plates 122.

In other words, in the torsional damper 100 of the embodiment discussed above, the torsional vibration is absorbed in a preferable manner even under low temperatures while suppressing changes in the tolerable transmission torque that would be caused by rusting of the friction plates 121 and 122 in the torque limiter 120.

(2) Generally, the volume of the oil chamber is greater when the wet torque limiter is arranged at the radially outward side of the disc-shaped torsional damper than when the wet torque limiter is arranged at the radially inward side. Thus, a large amount of lubricating oil must be used to fill the oil chamber when arranging the wet torque limiter on the radially outward side of the torsional damper. In the disc-shaped torsional damper, when the torsional damper rotates, centrifugal force acts on the lubricating oil filled in the oil chamber of the wet torque limiter. The centrifugal force that acts on the lubricating oil in the oil chamber is greater when the oil chamber is located further to the radially outward side of the torsional damper. Thus, when arranging the wet torque limiter on the radially outward side of the torsional damper, the rigidity and the sealing property of the oil chamber must be increased to withstand the load produced by the centrifugal force acting on the lubricating oil in the oil chamber.

In the torsional damper 100 according to the present embodiment, the torque limiter 120, which is the wet torque limiter, is arranged at the radially inward side of the damper 130 in the torsional damper 100. Thus, in comparison with a torsional damper in which the torque limiter 120 is arranged at the radially outward side of the damper 130, the oil chamber 129 has a reduced volume, and the centrifugal force that acts on the lubricating oil in the oil chamber 129 is smaller.

Accordingly, in the torsional damper 100 of the embodiment discussed above, the oil chamber 129 is filled with a small amount of lubricating oil, and the rigidity and sealing that withstands the load produced by the centrifugal force are ensured. This prevents manufacturing costs and weight of the torsional damper 100 from increasing.

(3) In terms of preventing the manufacturing cost and weight of the torsional damper from increasing by arranging the wet torque limiter on the radially inward side, it is preferable that the wet torque limiter be arranged as close as possible to the center of the torsional damper. In the torsional damper 100 of the present embodiment, the oil chamber 129 is formed on the outer circumferential surface of the hub 110, which is coupled to the input shaft 200. In other words, in the torsional damper 100 of the present embodiment, the wet torque limiter 120 is arranged at the most radially inward portion. This is advantageous for preventing manufacturing costs and weight from increasing.

(4) When arranging the oil seal at the radially outward side of the torsional damper 100 in the oil chamber 129, centrifugal force increases the oil pressure, which acts on the oil seal. Thus, the sealing of the oil chamber 129 must withstand the increased oil pressure. However, in the torsional damper 100 of the embodiment discussed above, the oil seal 128 is arranged at the radially inward side of the torsional damper 100 in the oil chamber 129. Thus, the oil pressure increased by the centrifugal force does not act on the oil seal 128. This facilitates the sealing of the lubricating oil in the torsional damper 100 compared to a torsional damper in which the oil seal is arranged at the radially outward side.

(5) The area of the sealed surface decreases when the oil seal is located at a more radially inward position so that the sealing of the lubricating oil is facilitated. Further, the oil seal being located at a more radially inward position shortens the moving distance of the oil seal due to relative rotation between the portions in which the oil seal is press-fitted, and less wear occurs in the oil seal. In the torsional damper 100 of the embodiment discussed above, the position of the oil seal 128 is set to seal the oil chamber 129 at the outer circumferential surface of the hub 110, and the position of the oil seal 128 is set to be as close as possible to the center of the torsional damper 100. This suppresses wear of the oil seal 128, and improves the sealing of the lubricating oil.

The above-discussed embodiment may be modified into the forms described below.

Figure 3:
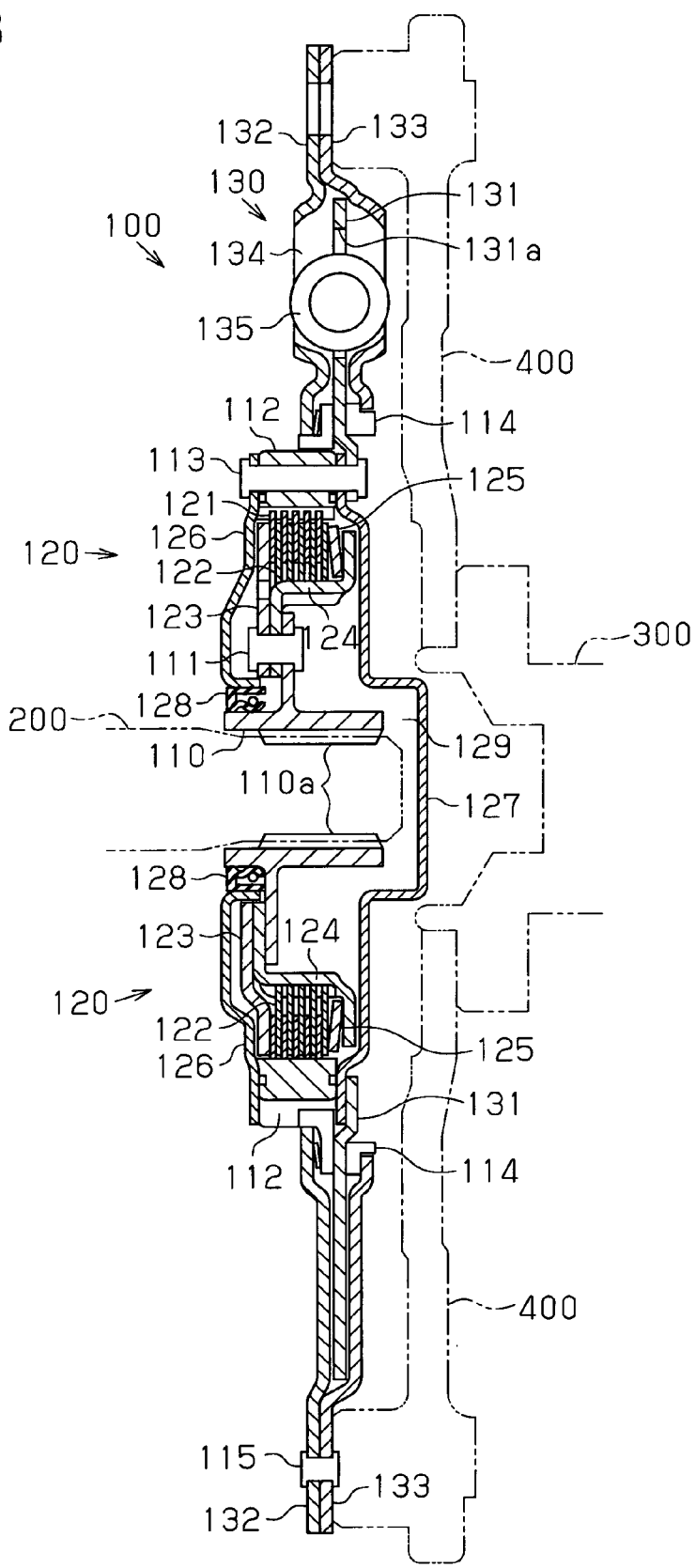
FIG. 3 is a cross-sectional view showing a modification of the torsional damper.

As shown in FIG. 1, the oil chamber 129, which encompasses the friction plates 121 and 122 and the supports 123 and 124, is formed on the outer circumferential side of the hub 110 in the embodiment discussed above. However, the oil chamber 129 does not have to be shaped in such a manner. For example, as shown in FIG. 3, the second wall member 127 may have a shape including a lid-shaped central portion to cover the distal portion of the input shaft 200. With such a second wall member 127, as shown in FIG. 3, the oil chamber 129 encompasses the distal portion of the input shaft 200. As shown in FIG. 3, the employment of such a structure seals the oil chamber 129 just by press-fitting a single oil seal 128 to the basal side (left side in FIG. 3) of the input shaft 200, that is, the portion in which the outer circumferential surface of the hub 110 and the inner circumferential end of the first wall member 126 face each other.

Further, the oil chamber 129 in the torsional damper 100 is of a lubricating oil sealing type in which the oil chamber 129 is sealed beforehand in a state filled with lubricating oil. However, the oil chamber 129 may be of a lubricating oil supply type in which lubricating oil is supplied from outside the oil chamber 129 through a lubricating oil supply passage.

Figure 4:
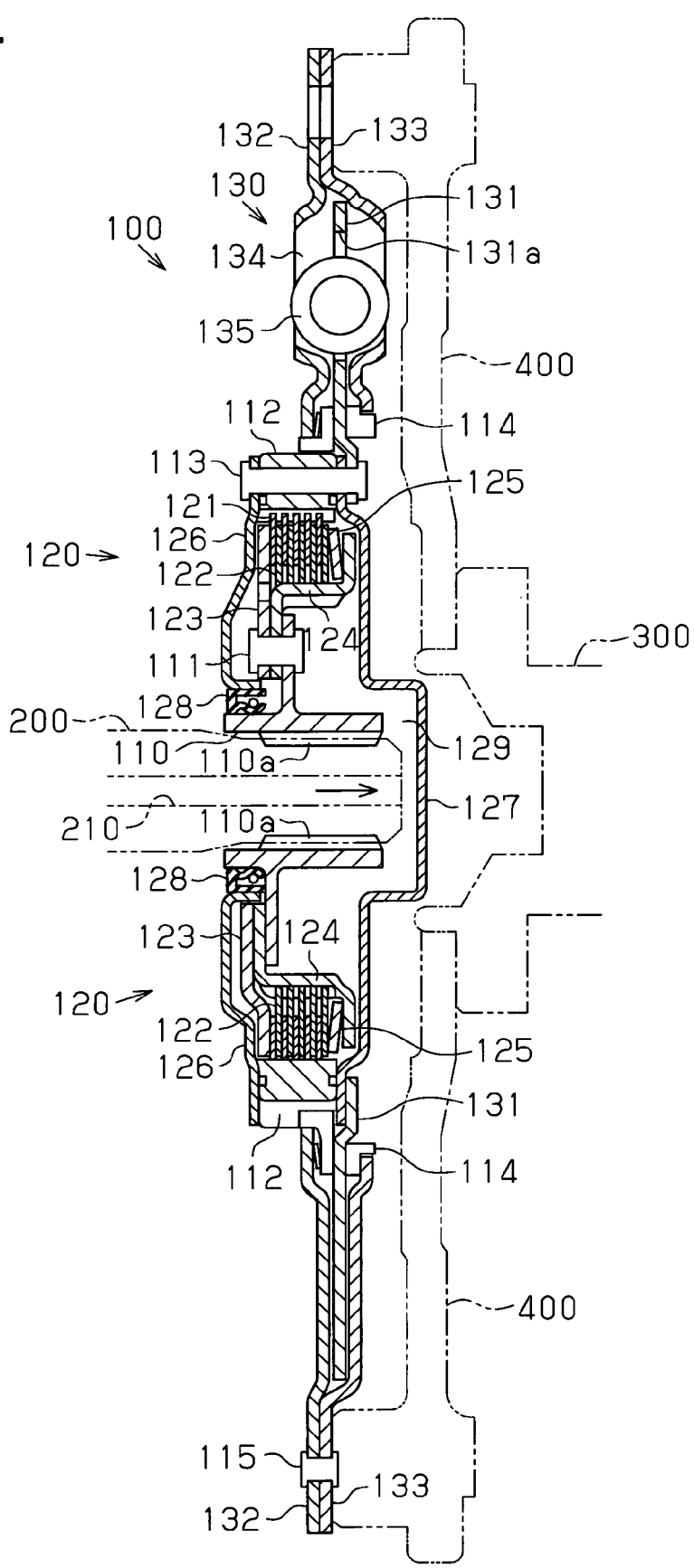
FIG. 4 is a cross-sectional view showing a modification of the torsional damper.

In detail, the oil chamber 129 of the lubricating oil supply type is realized by an input shaft 200 through which a lubricating oil supply passage 210 extends, as shown by the double-dashed lines in FIG. 4. Lubricating oil is supplied into the oil chamber 129 through the lubricating oil supply passage 210, as indicated by the arrow.

Figure 5:
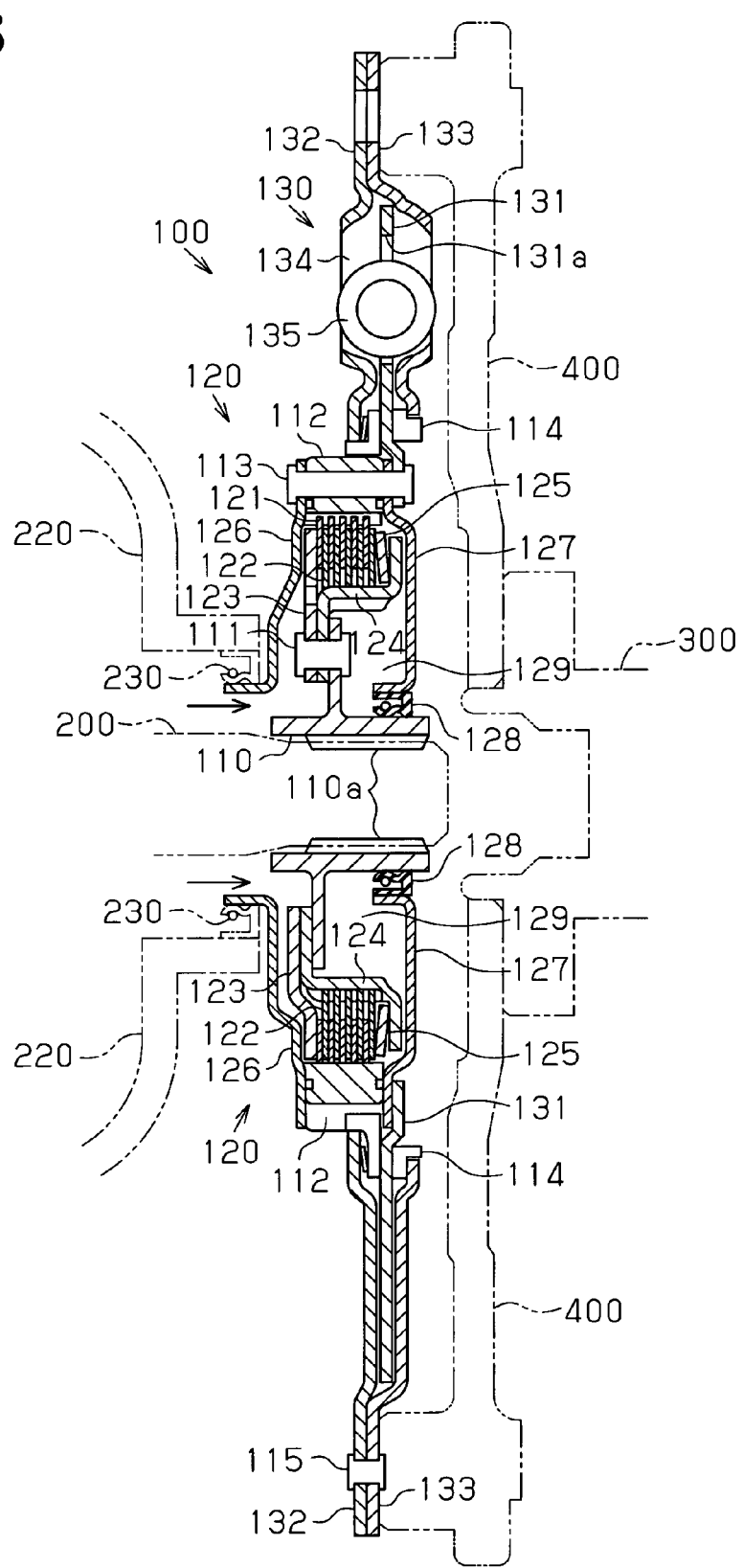
FIG. 5 is a cross-sectional view showing a modification of the torsional damper.

Further, as shown in FIG. 5, the inner circumferential end of the first wall member 126 may be flange-shaped and extended toward a housing 220 of the transmission, and an oil seal 230 may be press-fitted between the inner circumferential end and the transmission housing 220. In such a structure, lubricating oil is supplied into the oil chamber 129 from the transmission side, as indicated by the arrow.

Figure 6:
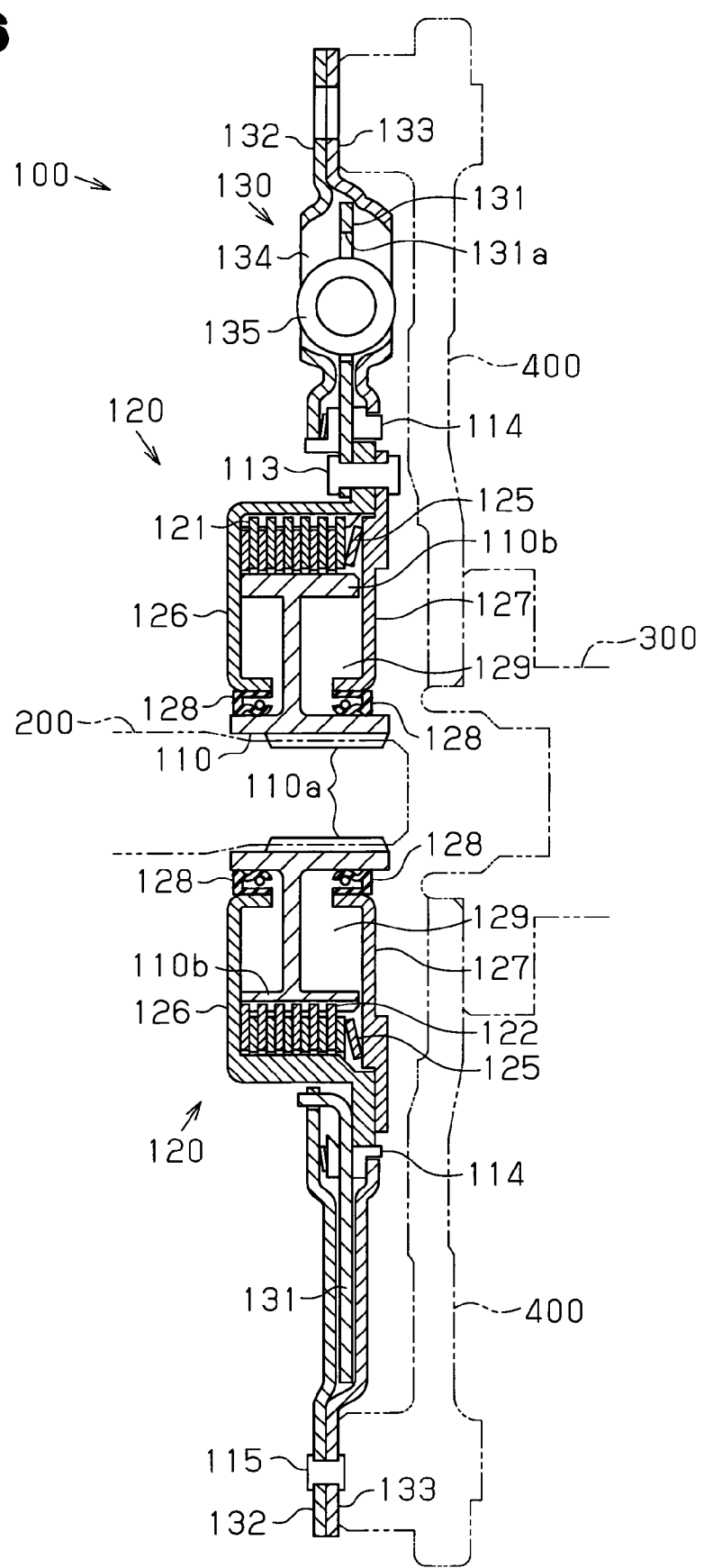
FIG. 6 is a cross-sectional view showing a modification of the torsional damper.
Figure 7:
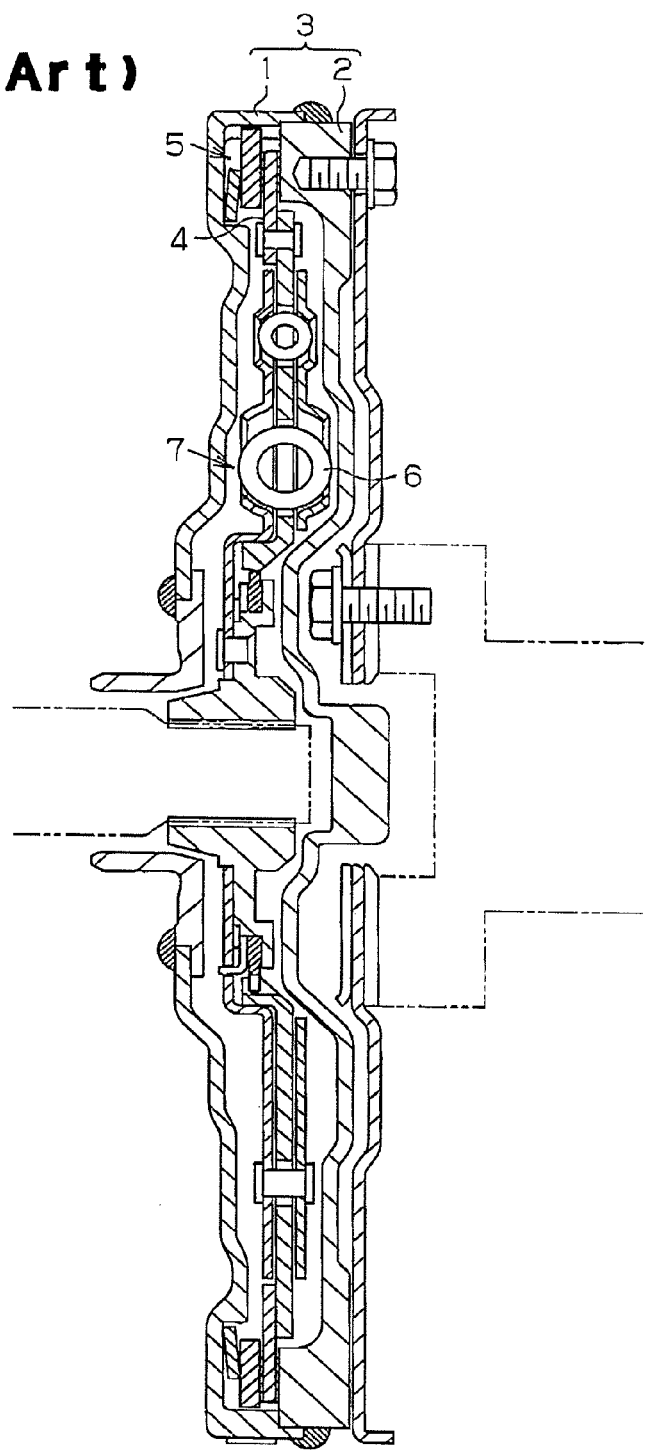
FIG. 7 is a cross-sectional view showing a torsional damper of the prior art.

The torsional damper 100 may include the oil chamber 129 from which, for example, the supports 123 and 124 and the intermediate member 112 are eliminated, as shown in FIG. 6. In detail, as shown in FIG. 6, the outer circumferential portion of the hub 110 may include a support 110b, which includes splines engaged with the second friction plates 122 in a manner prohibiting relative rotation. Further, the intermediate member 112 is eliminated, and splines engaged with the first friction plates 121 in a manner prohibiting relative rotation may be arranged at the inner circumferential surface of the first wall member 126. The first wall member 126, the second wall member 127, and the disc member 131 are directly fixed by the rivets 113 so as to hold the friction plates 121 and 122 and the disc spring 125 between the first wall member 126 and the second wall member 127. The oil seal 128 is press-fitted between the first and second wall members 126 and 127 and the outer circumferential surface of the hub 110 to form the oil chamber 129. Such a structure allows the number of components forming the torsional damper 100 to be reduced, lowers manufacturing costs of the torsional damper 100, and allows for the weight of the torsional damper 100 to be decreased.

In the embodiment discussed above, in the torsional damper 100, the torque limiter 120, which is a wet torque limiter, is arranged on the radially inward side of the damper 130, which is a dry damper. However, an advantage similar to the above-described advantage (1) may be obtained as long as a torsional damper at least combines a wet torque limiter and a dry damper. In other words, torsional vibration may be absorbed in a preferable manner even under low temperatures while suppressing changes in the tolerable transmission torque resulting from rusting of the friction members in the torque limiter even when a torsional damper includes a wet torque limiter arranged at the radially outward side of a dry damper.

In the embodiment discussed above, the torsional damper 100 includes the hysteresis mechanism 114. However, the hysteresis mechanism 114 may be eliminated. Alternatively, the hysteresis mechanism 114 may be arranged at the radially outward side of the damper 130.

The shape of the oil chamber 129 in the torque limiter 120 and the structure for forming the oil chamber 129 may be changed. However, as described above, the sealing of the lubricating oil is facilitated, and the oil seal wears less when the oil seal is located further radially inward in the torsional damper. Thus, when changing the shape of the oil chamber 129 and the structure for forming the oil chamber 129, it is preferable that the oil seal be located at the radially inward side of the torsional damper 100.

In the embodiment discussed above, the present invention is embodied as a torsional damper for coupling a hybrid transaxle and an internal combustion engine of a hybrid vehicle. However, the present invention is not limited to a torsional damper that couples a hybrid transaxle and an internal combustion engine. The present invention may be applied to any torsional damper including a torque limiter and a damper. Thus, a torsional damper according to the present invention may be applied to, for example, a portion coupling an automatic transmission and an internal combustion engine as long as a torsional damper including both a torque limiter and a damper may be applied to such a portion.

The present examples and embodiments are to be considered as illustrative and not restrictive, and the invention is not to be limited to the details given herein, but may be modified within the scope and equivalence of the appended claims.

While the invention has been described in detail and with reference to specific embodiments thereof, it will be apparent to one skilled in the art that various changes and modifications can be made therein without departing from the spirit and scope thereof.

What is claimed is:

1. A torsional damper comprising:
    a torque limiter including at least two friction members, the torque limiter allowing transmission of torque with frictional force acting between the friction members when torque input to the torque limiter is less than or equal to a tolerable transmission torque, and the torque limiter prohibiting transmission of excessive torque by slipping the friction members when the input torque is greater than the tolerable transmission torque; and
    a damper including a spring, the damper absorbing torsional vibration, which results from fluctuation in torque input to the damper, through resilient deformation of the spring;
    wherein the torque limiter is a wet torque limiter including an oil chamber filled with lubricating oil and holding the friction members in the oil chamber, and the damper is a dry damper in which the spring is not immersed in the lubricating oil.

2. The torsional damper according to claim 1, wherein the torsional damper is disc-shape and transmits torque between a member, which is coupled to a portion of the torsional damper located at a radially inward side of the wet torque limiter and the dry damper, and a member, which is coupled to a portion of the torsional damper located at a radially outward side of the wet torque limiter and the dry damper; and
    the wet torque limiter is arranged at the radially inward side of the dry damper.

3. The torsional damper according to claim 1, further comprising:
    an oil seal that seals the oil chamber, the oil seal being arranged at a radially inward portion of the torsional damper in the oil chamber.

4. The torsional damper according to claim 3, wherein the wet torque limiter includes a first member and a second member, which are arranged in concentricity, the first member being located at the radially outward side of the torsional damper, the second member being located at the radially inward side of the torsional damper, the friction members being arranged between the first member and the second member, and the first member and the second member being coupled to each other so as to be integrally rotatable by the frictional force generated between the friction members; and
    the oil chamber is formed by a wall, which extends towards a radially inward side of the torsional damper from the first member so as to encompass the friction members, and the oil seal, which is press-fitted between the second member and the wall.

5. The torsional damper according to claim 1, wherein the oil chamber is filled with oil beforehand and sealed encompassing the friction members.

6. The torsional damper according to claim 1, further comprising:
    a lubricating oil supply passage connected to the oil chamber, wherein the lubricating oil is supplied to the oil chamber through the lubricating oil supply passage.

* * * * *